No. 844,438. PATENTED FEB. 19, 1907.
G. L. BAYLEY.
FILTERING APPARATUS.
APPLICATION FILED JULY 28, 1906.

2 SHEETS—SHEET 1.

No. 844,438. PATENTED FEB. 19, 1907.
G. L. BAYLEY.
FILTERING APPARATUS.
APPLICATION FILED JULY 28, 1906.
2 SHEETS—SHEET 2.
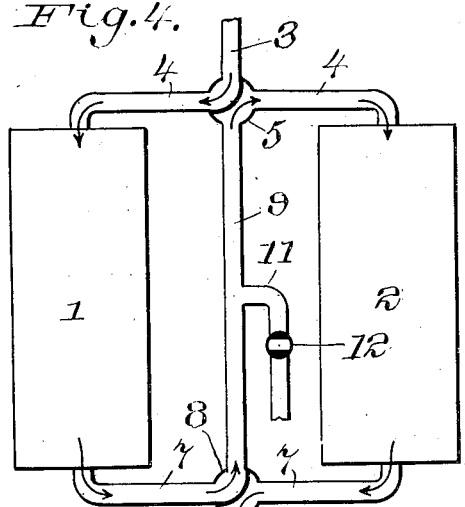
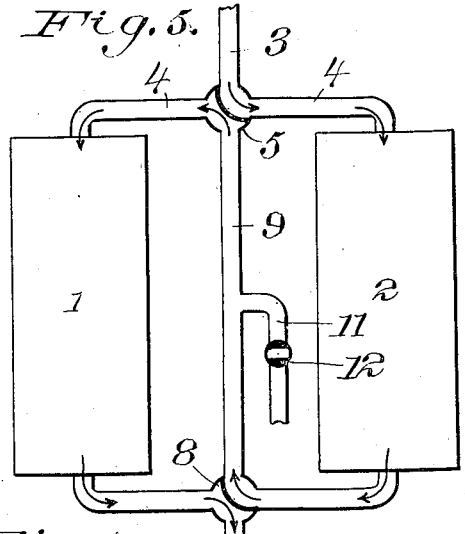
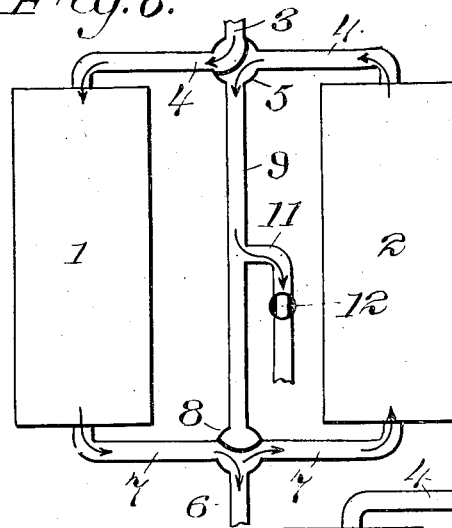
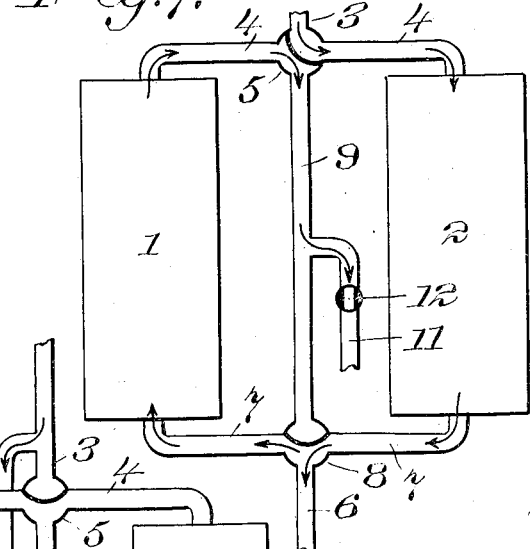
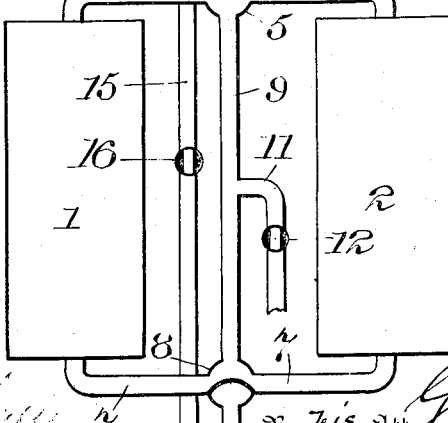
Witnesses
Inventor
Guy L. Bayley.
By his Attorney

UNITED STATES PATENT OFFICE.

GUY L. BAYLEY, OF PITTSBURG, PENNSYLVANIA, ASSIGNOR TO THE CUMMINGS FILTER CO., A CORPORATION OF WEST VIRGINIA.

FILTERING APPARATUS.

No. 844,438.   Specification of Letters Patent.   Patented Feb. 19, 1907.

Application filed July 28, 1906. Serial No. 328,261.

*To all whom it may concern:*

Be it known that I, GUY L. BAYLEY, a citizen of the United States of America, and a resident of Pittsburg, county of Allegheny, State of Pennsylvania, have invented certain new and useful Improvements in Filtering Apparatus, of which the following is a specification.

My invention relates generally to filtering apparatus, and more specifically consists of certain improvements in pressure-filters of the class described in an application filed by me May 4, 1906, and Serially numbered 315,169.

As herein embodied the invention is designed to provide, first, for single and double filtering of a fluid; second, for washing the filtering medium without interrupting the delivery of the filtered fluid, and, third, for the delivery of the fluid direct from the supply when filtering is not necessary or to permit examination, repair, &c., of the filtering apparatus.

The object of the invention is to reduce the number of valves ordinarily employed and otherwise simplify the supply and delivery connections, so as to enable the direction of flow of the fluid to be regulated and controlled in a ready and convenient manner.

Apparatus suitable for carrying my invention into effect is illustrated in the accompanying drawings. I wish it understood, however, that I do not limit myself to either the exact construction or arrangement shown, as various changes may be made therein without departing from the spirit and scope of my invention.

Figure 1:
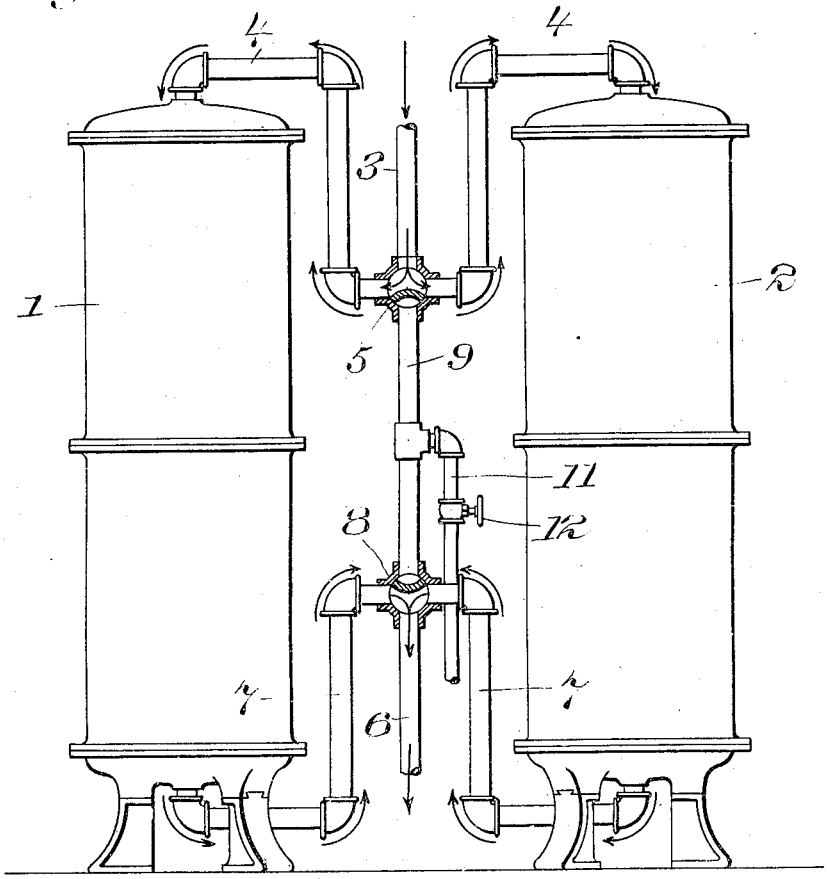
Figure 3:
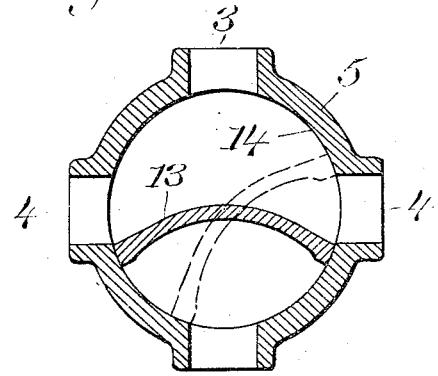
Figure 2:
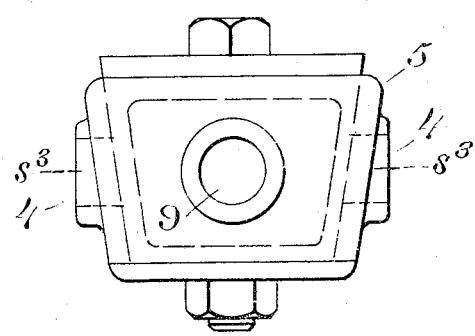

In the drawings, Figure 1 is a view in front elevation, partly in section, of a filter constructed in accordance with my invention. Fig. 2 is an enlarged detail view of one of the four-way valves employed in the connections between the tanks. Fig. 3 is a sectional view thereof, taken on the line $s^3$ $s^3$ of Fig. 2. Fig. 4 is a view in diagram showing the position of the valves for double filtering, the direction of flow being from left to right, as indicated by arrows. Fig. 5 is a similar view showing the valves shifted to reverse the direction of flow. Figs. 6 and 7 show the valves in a position to maintain the supply of filtered fluid and utilize that portion delivered in excess of the demand to wash either the right or left hand tank. Fig. 8 illustrates a modification in which a by-pass around the filter permits the latter to be cut out and the fluid to flow direct from the supply to the delivery main.

Referring now to the drawings, the filter shown may comprise any number of tanks or filtering vessels, such as are indicated at 1 and 2. Preferably two tanks are employed and are provided in the usual manner with a suitable bed of filtering material, &c. (Not shown.) Each of the tanks is connected at its upper end with a supply-main (indicated at 3) by a branch pipe 4, and controlling the several branch connections there is a valve 5 of the four-way type, which is shown in detail in Figs. 2 and 3.

The lower end of each tank is connected to a delivery-main 6 by a branch pipe 7, and these branch connections are controlled by a four-way valve 8, similar to the valve 5 above referred to.

Interposed between the valve-casings there is a connecting-pipe 9, which is provided about centrally of its length with a waste connection 11, controlled by a valve 12.

The four-way valves 5 and 8 are preferably of the rotary type, as shown, the valves proper (indicated at 13) being U-shaped and coöperating with circular seats 14, provided in the casings.

Each valve-casing is tapped at four equispaced points to receive the main and branch connections, and as arranged such connections may be controlled by the valve either singly or in pairs, as shown in Fig. 3.

In order that the supply of the fluid may be continued when it becomes necessary to cut out both filtering vessels, a by-pass 15 controlled by a valve 16 may be employed to connect the supply-main 3 direct with the delivery-main 6, as shown in Fig. 8.

In the use of the apparatus for single filtering—that is to say, when the fluid is to be passed through one filtering vessel only—the valves may be turned to the position shown in Fig. 1 to connect the tanks in parallel or to the position shown in either Fig. 6 or Fig. 7 to connect them singly with the mains. In Fig. 1 the apparatus is shown operating at full capacity, both filtering vessels being in use, as represented by the arrows, indicating the direction of flow of the fluid. In Figs. 6 and 7 the apparatus is shown operating at about half capacity, as filtering is being carried on in only one tank.

For double filtering—that is, causing the fluid to pass through both filtering vessels in series—the valves are turned to the position shown in either Figs. 4 or 5. In Fig. 4 the fluid, as indicated by arrows, passes first through the tank at the left and then through that at the right, while in Fig. 5 the direction of flow is reversed.

When it is desired to wash the filter-beds of the several tanks without interrupting the supply or delivery of the filtered fluid, the valves are turned first to the position shown in Fig. 6, in which single filtering is being carried on in the left-hand tank, while a reverse-current of the filtered fluid discharged through the waste connection 15 is washing out the filter-bed in the tank at the right. Turning the valves to the position shown in Fig. 7 will obviously reverse the direction of flow and result in washing the filter-bed of the left-hand tank with a current of filtered fluid from the tank at the right.

If for any reason it becomes necessary to cut out the entire filtering system, the main valves are arranged as in Fig. 8, and the supply of unfiltered fluid may then be continued through the by-pass connecting the mains by opening the valve 16.

The extreme simplicity of the supply and delivery connections in which only two main valves are employed to produce the variety of results above described overcomes many serious objections to apparatus of this class now in use and gives rise to a number of important advantages which will be apparent from the foregoing description.

Having therefore described my invention, I claim—

1. In a filter system, a plurality of filtering vessels, requisite supply, delivery, intercommunicating and waste connections for the several vessels, and two valves controlling access to all said connections.

2. In a filter system, the combination of a plurality of filtering vessels, supply and delivery mains, a four-way connection interposed between the several vessels and the supply-main, a second four-way connection interposed between the several vessels and the delivery-main, and a single valve controlling all four of the ports in each connection.

3. In a filter system, the combination of a plurality of filtering vessels, a connection from one vessel to the other at each end thereof, a pipe uniting the connections, and two valves in said pipe alone controlling all directions of flow of fluid through said connections.

4. In a filter system, the combination of a plurality of filtering vessels, a connection from one vessel to the other at each end thereof, a pipe uniting the connections and provided with a valved branch, and two valves in said pipe alone controlling all directions of flow of fluid through said connections.

5. In a filter system, the combination of a plurality of filtering vessels, a connection from one vessel to the other at each end thereof, a pipe uniting the connections, and two four-way valves in said pipe alone controlling all directions of flow of fluid through said connections.

6. In a filter system, a plurality of filtering vessels, a connection from one vessel to the other at each end thereof, a pipe uniting the connections, two valves in the pipe alone controlling all directions of flow of fluid through the connections, and a valved by-pass bridging the valved portion of said pipe.

7. In a filter system, the combination of a plurality of filtering vessels, supply and delivery mains, a waste-pipe common to the several vessels, a single valve in the supply-main, a single valve in the delivery-main, and connections controlled by the valves whereby either vessel may be directly connected with the waste-pipe without disturbing the filtering operation in the other.

8. In a filter system, the combination of a plurality of filtering vessels, supply and delivery mains, a waste-pipe common to the several vessels, a four-way valve in the supply-main, a four-way valve in the delivery-main, connections from one valve to one end of each vessel and to the waste-pipe, and connections from the other valve to the other end of each cylinder and to the waste-pipe.

Signed at New Orleans, Louisiana, this 23d day of July, 1906.

GUY L. BAYLEY.

Witnesses:
F. L. BERNADAS,
SAML. WOLF.